United States Patent [19]

Tokutake

[11] Patent Number: 5,117,886
[45] Date of Patent: Jun. 2, 1992

[54] PNEUMATIC RADIAL TIRE FOR PASSENGER CARS

[75] Inventor: Masayuki Tokutake, Kodaira, Japan

[73] Assignee: Bridgestone Corporation, Tokyo, Japan

[21] Appl. No.: 467,462

[22] Filed: Jan. 19, 1990

[30] Foreign Application Priority Data

Mar. 15, 1989 [JP] Japan .................................. 1-62958

[51] Int. Cl.⁵ .......................... B60C 3/04; B60C 15/06
[52] U.S. Cl. ..................... 152/454; 152/546; 152/555
[58] Field of Search ............... 152/454, 539, 546, 555, 152/543

[56] References Cited

U.S. PATENT DOCUMENTS

| | | | |
|---|---|---|---|
| 3,961,657 | 6/1976 | Chrobak | 152/555 X |
| 4,155,392 | 5/1979 | Duderstadt et al. | 152/454 X |
| 4,815,511 | 3/1989 | Brayer et al. | 152/454 X |
| 4,867,218 | 9/1989 | Asano et al. | 152/547 X |
| 4,869,307 | 9/1989 | Bormann et al. | 152/533 |

FOREIGN PATENT DOCUMENTS

| | | | |
|---|---|---|---|
| 0995645 | 6/1965 | United Kingdom | 152/543 |
| 2037676 | 7/1980 | United Kingdom | 152/454 |

*Primary Examiner*—Michael W. Ball
*Assistant Examiner*—Nancy T. Krawczyk
*Attorney, Agent, or Firm*—Sughrue, Mion, Zinn, Macpeak & Seas

[57] ABSTRACT

To improve the tire transversal rigidity and further the tire contact area with the ground, that is, to improve the tire cornering power or vehicle turning performance, the tire inner sidewall portion is reinforced by a carcass turned-up end portion, a hard rubber filler, and at least one inclined cord layer by extending all the radially outward ends thereof to roughly the middle of the tire sidewall. Further, the maximum carcass width position is located radially outward away from a bead heel by a distance (V) of at least 60% of a tire section height (J) before inflation but located radially outward away from the bead heel by a distance (U) of about 55 to 75% of the above before-inflation distance (V) after inflation, and the axial bead heel distance (A) between the two opposite beads before inflation is determined smaller than that (B) therebetween after inflation.

10 Claims, 2 Drawing Sheets

PNEUMATIC RADIAL TIRE FOR PASSENGER CARS

BACKGROUND OF THE INVENTION

1. Field of the Invention

The present invention relates to a pneumatic radial tire suitable for use in high-performance passenger cars, and more specifically to an ultralow section radial tire.

2. Description of the Prior Art

Recently, high-performance passenger cars with a ratio of the vehicle weight to the maximum output horsepower is 8 kg/Hp or less have come into wide use with increasing highways and user's choice of superior quality cars. In pneumatic tires used for these high-performance passenger cars since a higher vehicle turning performance is required during travelling, a prior-art pneumatic tire, has the rigidity of the belt layers increased along the tire circumferential direction to reduce the deformation of the tire crown portion such has been proposed for providing a higher vehicle turning performance.

In the above-mentioned prior-art pneumatic tire, however, there still exists a problem in that the vehicle turning performance has not yet been satisfactory to such an extent as to be required for the present-day high-performance passenger cars.

SUMMARY OF THE INVENTION

With these problems in mind, therefore, it is the primary object of the present invention to provide a pneumatic radial tire suitable for use in high-performance passenger cars, whereby the tire transversal rigidity and the tire contact area with the ground can be increased to improve tire cornering power or vehicle turning performance.

To achieve the above-mentioned object, the pneumatic radial tire, according to the present invention, formed with cylindrical crown portion (3) and a sidewall (7) extending from a shoulder portion (4) to a radially innermost bead (6) at which a bead ring (5) is embedded and including: a carcass (10) composed of at least one carcass ply (12), each radially inward end thereof being turned up axially outwardly around a bead ring (5) to form a carcass turned-up portion (11) at a tire radially outward end; a belt (25) composed of at least two belt layers (27, 28) and arranged on said carcass crown portion; a tread (26) formed on said belt; a hard rubber filler (15) disposed between the carcass ply and the carcass turned-up end portion so as to extend taperingly from the bead ring toward the crown portion; and at least one inclined cord layer (18, 19) overlapped with said hard rubber filler, is characterized in that radially outward ends (11a, 15a, 18a or 19a) of said carcass turned-up end portions (1), said hard rubber filler (15) and said inclined cord layer (18, 19) all extend to roughly a middle of the tire sidewall (7) to reinforce only the radially inner sidewall portion (8); a maximum carcass width position (C) is located radially outward away from a bead heel (6a) of the bead by a distance (V) of at least 60% of a tire section height (J) before the tire is inflated, but dislocated toward the bead side radially outward away from the bead heel by a distance (U) of about 55 to 75% of the above before-inflation distance (V) after the tire has been inflated; and an axial bead side heel distance (A) between two opposite beads (6) before the tire is inflated is smaller than that (B) after the tire has been inflated, whereby since a high tension is generated at the tire sidewall, after the tire has been inflated, to increase tire transversal rigidity and further tire contact area with the ground, tire cornering power or vehicle turning performance can be increased.

BRIEF DESCRIPTION OF THE DRAWINGS

The features and advantages of the pneumatic radial tire for passenger cars according to the present invention will be more clearly appreciated from the following description taken in conjunction with the accompanying drawings in which like reference numerals designate corresponding elements and in which.

DETAILED DESCRIPTION OF THE PREFERRED EMBODIMENTS

An embodiment of the pneumatic radial tire according to the present invention will be described hereinbelow with reference to the attached drawings.

Figure 1:
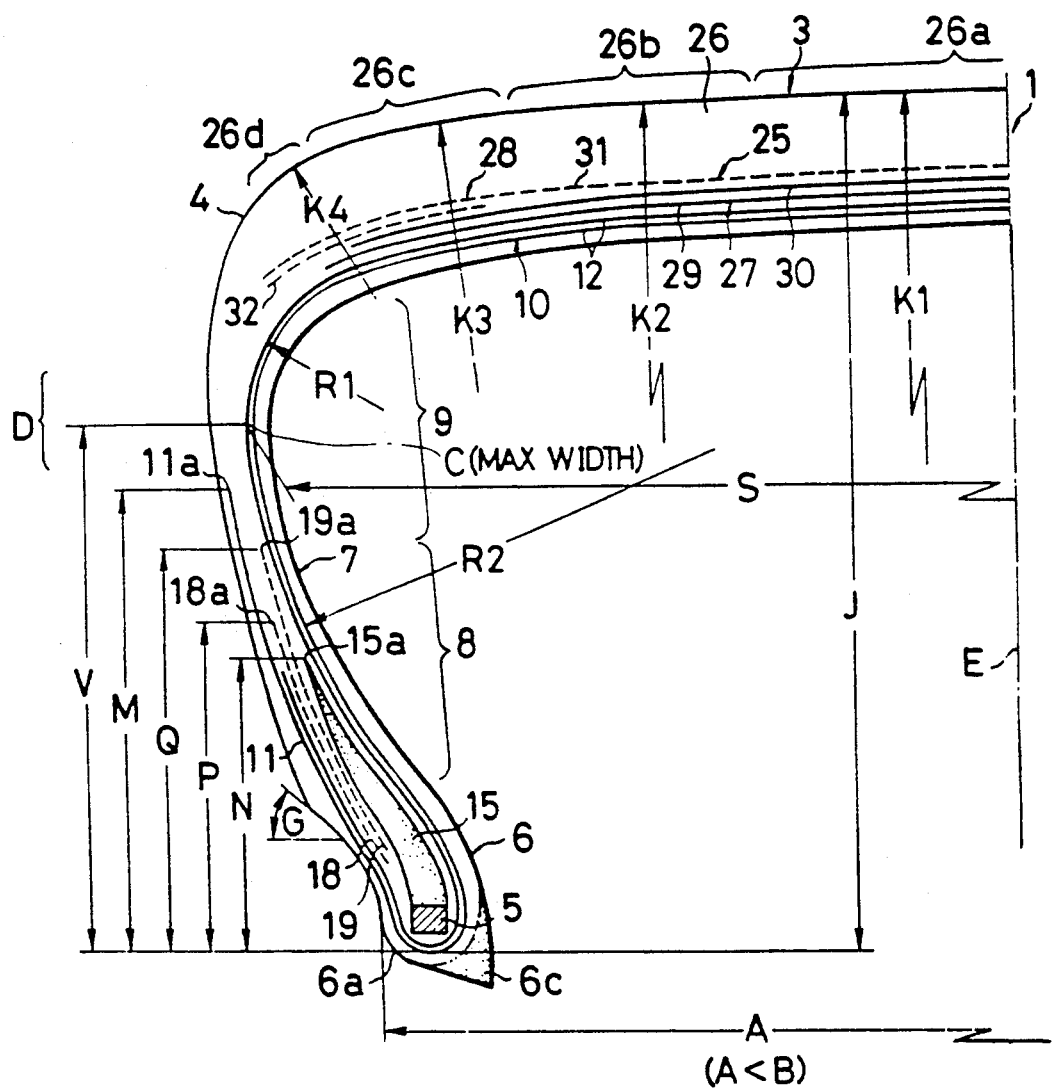
FIG. 1 is a cross-sectional view showing an embodiment of the tire according to the present invention, taken along the meridian plane of the tire, obtained when vulcanized within a mold.

FIG. 1 illustrates a tire 1 according to the present invention, taken along the meridian plane, in the state where the tire 1 is molded for vulcanization within a mold.

Figure 2:
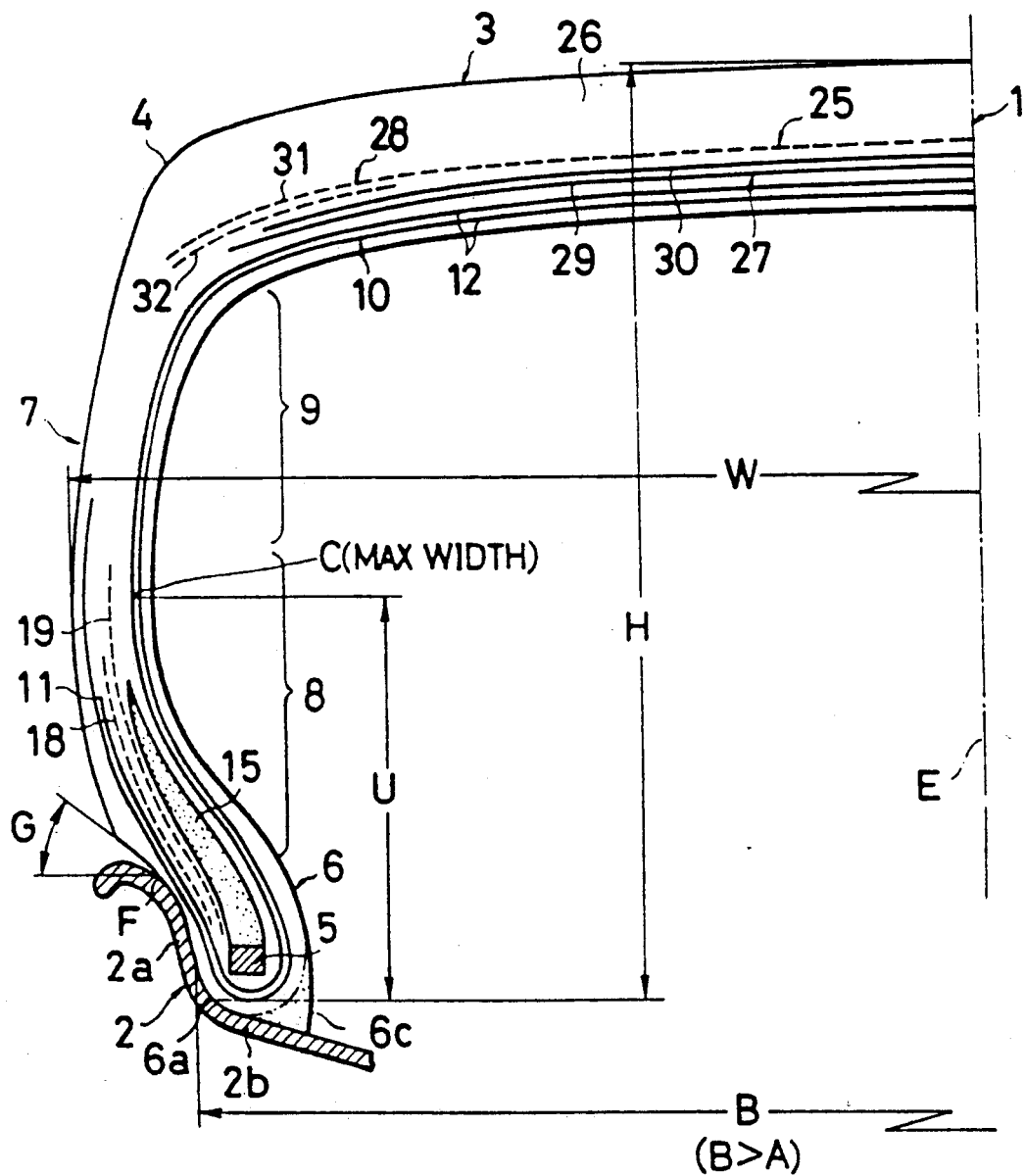
FIG. 2 is a similar cross-sectional view showing the same tire, taken along the same tire meridian, obtained when inflated with air at a predetermined inner pressure.

FIG. 2 illustrates the same tire in the state where it is mounted on a rim 2 and inflated.

The tire 1 of the present invention is an ultralow section radial tire whose aspect ratio (a ratio J/W of tire section height J to the maximum tire width W) lies between 0.3 and 0.6 under the condition that the tire is inflated.

In this embodiment, the tire size is 225/50R 16 (the aspect ratio: about 0.5); the rim size is 8 JJ×16 (the normal rim); the inflation pressure is 2.7 kg/cm$^2$; the tire section height J is 114 mm; and the maximum tire width W is 222 mm.

The tire 1 is formed with a cylindrical crown portion 3 and a sidewall 7 extending from a shoulder portion 4 (the axially end portion of the crown portion) to a radially innermost end bead 6 at which a bead ring 5 is embedded. The sidewall 7 can be divided into an inner bead side sidewall 8 and an outer crown side sidewall 9 with the central sidewall portion as a boundary.

In the tire according to the present invention, an axial distance A between two bead heels 6a of the two opposite beads 6 (the radially innermost tire end width) at vulcanizing molding process is determined smaller at least by 12.7 mm (0.5 inch) than that distance B at tire inflation. That is, the tire 1 is vulcanized under the condition that the innermost tire end width is smaller than the rim width. This is because when the difference in the axial bead heel distance between A (at vulcanization) and B (at inflation) is less than 12.7 mm (0.5 inch), since the axially outward deformation of the inner sidewall 8 is too small at inflation, it is impossible to improve the vehicle turning performance. However, it is preferable to determine the above difference between the two (A and B) less than 50.8 mm (2 inch), because when the distance A of the innermost end tire width at vulcanization molding process is small, it is difficult to mount the tire on a rim 2, that is, to fit the bead heel portion to a bead seat portion 2b of a rim 2. Therefore, in this embodiment, the distance A is 177.8 mm (7 inch); the distance B is 203.2 mm (8 inch); the difference is 25.4 mm (1 inch). Further, the crown width at inflation, that is, the tread width between one tread end 4 to the other tread end is determined to be substantially equal to the rim width in order to increase the tire contact area with the ground and improve the vehicle straight travelling stability, simultaneously.

In addition, it is preferable to determine the Shore hardness A (e.g. 95 degrees) of the rubber which forms a bead toe portion 6c is determined higher than that (e.g. 75 degrees) of the adjoining rubber portions. This is because if the rubber hardness at the bead toe portion 6c is low, since the toe portion 6c is easily compressed or deformed, it is impossible to prevent the bead 6 and the inner sidewall portion 8 from being obliquely deformed toward the tire axially inward direction when the tire is inflated.

The tire 1 is reinforced by a carcass 10 between the two bead rings 5. The carcass radially inward end is turned up from the axially inward side to the axially outward side to constitute a carcass turned-up portion 11 overlapped with the carcass 10. The carcass 10 is composed of at least one (three at the maximum) carcass ply 12, in which a number of fiber cords represented by rayon, polyester, nylon, etc. are embedded along the tire radial direction. In this embodiment, the carcass 10 is composed of two carcass plies 12 made of 1650 d/2 rayon cords. Further, in the carcass meridian plane cross-section, the carcass 10 takes a naturally balanced shape after the tire has been inflated as depicted in FIG. 2. In the vulcanizing molding process, however, since the distance A between the two opposite bead heels 6a at vulcanization is determined smaller by at least 12.7 mm (0.5 inch) than that B at inflation, the carcass 10 becomes into a roughly inverse triangular shape, as depicted in FIG. 1, in such a way that the tire width roughly decreases gradually from the crown portions 3 to the beads 6. As a result, the position C at which the carcass is the maximum width is located on the crown portion side radially outward away from the center of the sidewall 7 at the vulcanization molding process. In this invention, the above-mentioned maximum carcass width position C at the vulcanization molding process is determined to be located radially outward away from the bead heel 6a by a distance V which corresponds to at least 60% of a tire section height J between the bead heel 6a to the tire crown portion 3. This is because when it is less than 60%, since the maximum carcass with position C is already located roughly at the middle of the sidewall 7 at the vulcanization process, it is impossible to deform the middle portion of the sidewall 7 toward the axially outward side after inflation. Therefore the deformation degree at the radially outward sidewall portion 9 is reduced, so that it is impossible to improve the vehicle turning performance. In this connection, the radially outward upper limit of the above maximum carcass width position C is 95% or more or near 100% of the tire section height J, according to the tire conditions. In the practical point of view, however, the preferable range of the above position C is at the most 75% at the maximum of the tire section height J. That is, the maximum tire width position C is preferably located within an area D determined radially outward away from the bead heel portion 6a by a distance of 60 to 75% of the tire section height J. In this embodiment, the distance V of the maximum carcass width position C radially outward away from the bead heel 6a at vulcanization molding process is 73 mm. which corresponds to 64% of the tire section height J (114 mm). Further, the maximum carcass width S under these conditions (at vulcanization) is 210 mm. In addition, it is preferable that a radius $R_1$ of curvature of the carcass 10 on the crown side, that is, on the radially outward side of the maximum carcass width position C is determined smaller than that $R_2$ of the carcass 10 on the bead side, that is, on the radially inward side of the maximum carcass width position C in order to improve the vehicle turning performance. In this embodiment, the above radii of the curvature of the carcass are determined as follows: $R_1 = 20$ mm and $R_2 = 75$ mm.

A rubber filler 15 whose thickness is tapered down from the bead ring 5 to the crown portion 3 is disposed between the carcass 10 and the carcass turned-up portion 11 by bonding the thicker base end of the filler 15 to the outer surfaces of the two bead rings 5. The rubber filler 15 is a hard rubber whose Shore hardness A preferably lies between 65 and 95 degrees to effectively increase the rigidity of the inner sidewall portion 8. In this embodiment, the rubber filler is made of a hard rubber with a Shore hardness A of 80 degrees.

Further, two inclined cord layers 18 and 19 are disposed in overlap relationship with respect to the rubber filler 15 in order to reinforce the inner sidewall portion 8. Although at least one inclined cord layer is necessary, it is preferable to arrange two (or more) inclined cord layers in such a way that a first layer 19 is disposed on the axially inward side and a second layer 18 is disposed on the axially outward side of the rubber filler 15, respectively to more effectively increase the rigidity of the inner sidewall portion 8. In this embodiment, although two inclined rubber layers 18 and 19 are disposed between the rubber filler 15 and the carcass turned-up portion 11 to increase the rigidity of the inner sidewall portion 8, it is also possible to place these inclined cord layers on the axially outward side of the carcass turned-up portion 11 or between the rubber filler 15 and the carcass 10. Where plural inclined cord layers are disposed in particular, it is more preferable to dispose some of the inclined cord layers between the rubber filler 15 and the carcass turned-up portion 11 and the remaining layers at the other positions such as on the axially outward side of the carcass turned-up portion 11. As described above, the inclined cord layers 18 and 19 can be directly overlapped in contact with the rubber filler 15 or indirectly overlapped via the carcass turned-up end portion 11, as described above.

Further, the radially inward ends of the inclined cord layers 18 and 19 are located near the bead ring 5 and therefore overlapped with a rim flange 2a (shown in FIG. 2) when the tire is mounted on a rim 2. However, as far as the radially inward ends of these inclined cord layers 18 and 19 are overlapped with the rim flange 2a, it is possible to form layers 18 and 19 in such a way that each inward end portion thereof is located slightly toward the crown portion 3 from the bead ring 5. Each inclined cord layer 18 or 19 is formed by embedding a number of inclined cords extending at an intersection angle of 58 to 78 degrees with respect to the direction of the cords embedded in the carcass turned-up portion 11 at the position where the inclined cord layer 18 or 19 is overlapped with the rim flange 2a. Further, when two layers 18 and 19 are arranged in this embodiment, it is preferable that the cords embedded in the layers 18 and 19 are inclined in a direction opposite to that of the cords embedded in the carcass turned-up end portion 11. In this embodiment, the cords of the layers 18 or 19 intersect the cords of the turned-up portion 11 at an intersection angle of about 68 degrees. The cords of the inclined cord layers 18 and 19 are preferably made of an inextensible material such as steel, aromatic polyamide fiber, etc. However, an extensible material such as rayon or polyester fiber can be used. In this embodiment, the cords of the inclined cord layers 18 or 19 are made of 1500 d/z aromatic polyamide fiber (KEVLAR in Trademark).

Further, in this embodiment, all the radially outward ends of the carcass turned-up portion 11, the rubber filler 15 and at least one of the inclined cord layer 18 or 19 extend to near roughly the middle portion of the sidewall 7. Therefore, the rigidity of the inner sidewall portion 8 can be increased markedly by these three layers of the carcass turned-up portion 11, the rubber filler 15 and the inclined cord layer 18 or 19 as compared with that of the outer sidewall portion 9 reinforced only by the inner linear and the outer coating rubber.

In this embodiment, in order to effectively increase the rigidity of the inner sidewall portion 8, it is particular desirable that the radially outward end 11a of the carcass turned-up portion 11 extends to a position radially outward away from the bead heel 6a by a distance M of 55 to 75% of the tire section height J at the vulcanization molding process. The radially outward end 15a of the rubber filler 15 extends to a position radially outward away from the bead heel 6a by a distance N of 25 to 45% of the tire section height J cords 18a and 19a of the two inclined cord layers 18 and 19 extend to positions radially outward away from the same bead heel 6a by distances P and Q of 40 to 60% of the same section height J. Here, in general, the middle portion of the sidewall 7 is located at a position radially outward away from the bead heel 6a by a distance of 60% of the tire section height J at the vulcanization molding process. In this embodiment, the radially outward end 11a of the carcass turned-up portion 11 is located from the bead heel 6a by a distance M=63 mm of 55% of the tire section height J and 15a of the rubber filler 15 is located from the same by a distance N=40 mm of 35% of J. The end 18a of the inclined cord layer 18 is located from the same by a distance P=45 mm of 39% of J. The end 19a of the inclined cord layer 19 is located from the same by a distance Q=55 mm of 48% of J. Further, it is preferable that the above distances decrease in the order of M, Q, P and N as in the present embodiment in order to effectively increase the rigidity of the inner sidewall 8.

Further, in this embodiment, a belt 25 is formed on the carcass 10 throughout the crown portion 3. A tread 26 is also formed on the belt throughout the crown portion 3. The belt 25 is composed of a main belt layer 27 and an auxiliary belt layer 28 for covering the outside surface of the main belt layer 27. The main belt layer 27 is composed of at least two main plies (two in this embodiment), that is, a first main ply 29 and a second main ply 30 in each of which cords are embedded at an inclination angle of 15 to 35 degrees with respect to the tire equatorial plane E so as to intersect each other. In this embodiment, 1×5 steel cords are embedded in each of the first and second main plies 29 and 30 at an inclination angle of 28 degrees with respect to the tire equatorial plane E so as to intersect each other. On the other hand, the auxiliary belt layer 28 is composed of at least one ply in which thermoshrinkable cords represented by nylon (1260 d/2 nylon in this embodiment) are embedded. In this embodiment, the auxiliary belt layer 28 is composed of a first auxiliary ply 31 broader than the main belt layer 27, a second auxiliary ply 32 disposed between the first auxiliary ply 31 and the second main ply 30 of the main belt layer 27 near the tire shoulder end 4, and a third auxiliary ply (not shown) disposed on the first auxiliary ply 31 in symmetrical positional relationship to the second auxiliary ply 32. The auxiliary belt layer 28 composed of three auxiliary plies 31 and 32 is formed by helically wrapping a rubber-coated ribbon around the main belt layer 27 so that the cords are arranged in the tire circumferential direction, that is, in parallel to the tire equatorial plane E. The rubber coated ribbon is made by arranging several (2 to 15) cords in parallel to each other and by coating or rubberizing these cords into a ribbon state. The above-mentioned method is effective to securely suppress the deformation of the belt 25 and to improve the tire uniformity. To form the auxiliary belt layer 28, the ribbon is wrapped around the main belt layer 27 (or the second main ply 30 of the main belt layer 27) in such a way that the second auxiliary ply 32 is first formed beginning from the axially inside toward the left shoulder end 4 in a first direction; secondly the first auxiliary layer 31 is formed from the left shoulder end 4 to the right shoulder end (not shown) in a second opposite direction; and lastly the third auxiliary layer (not shown) is formed from the right shoulder end portion to the axially inside toward the left shoulder portion 4 in the first direction.

Further, in the present invention, it is also possible to form only one or two first auxiliary plies 31 without forming the second and third auxiliary plies 32. As described above, since inextensible cords are embedded in the main belt layer 27, the belt layer 25 is substantially not extended in the tire circumferential direction.

The tread 26 is formed into a cylindrical shape as a whole and formed with a plurality of circumferential grooves and a plurality of transversal grooves spaced at substantially regular intervals along the tire circumferential direction and extending to intersect with the circumferential grooves, so that blocks can be partitioned by these grooves (all not shown). Further, in order to improve the tire ground contact performance, the outer contour of the tread 26 is axially divided into three or more (preferably four or more) regions with different curvatures in such a way that the radius of curvature of these regions decreases from the tire equatorial plane E to the tire shoulder portion 4. In this embodiment, the radius of curvature K1 of the first region 26a including the tire equatorial plane E is determined as K1=1600 mm. The radius of curvature K2 of the second region 26b adjoining to the first region 26a is determined as K2=470 mm. The radius of curvature K3 of the third region 26c adjoining to the second region 26b is determined as K3=90 mm. The radius of curvature K4 of the fourth region 26d adjoining to the third region 26c is determined as K4=20 mm. Further, although the tread 26 can be formed by a single rubber layer as in the present invention, it is also possible to form the tread 26 by two inner and outer rubber layers of different rubber properties according to the required tire performance.

The function of the tire 1 according to the present invention will be described hereinbelow. The tire 1 is vulcanized within a vulcanizing mold. During the vulcanization molding process, the tire 1 is formed into a roughly inverse triangular shape in the tire meridian cross section such that the tire width roughly decreases from the crown portion 3 to the bead 6 gradually, as depicted in FIG. 1, because the maximum carcass width portion C is located at a position radially outward away from the bead heel 6a by a distance of at least 60% of the tire section height J. Further a distance A between the two opposite bead heels 6a at vulcanization is determined smaller by at least 12.7 mm than that B at inflation.

After the vulcanization molding process has been completed, the tire 1 is removed from the vulcanization mold, inflated with air into an inner pressure of 1.0 to 3.5 kg/cm² and then cooled on a post-cure inflator. In this process, the distance between the two opposite bead heels 6a is determined to be equal to A at the vulcanization process in order to stabilize the shape of the vulcanized and molded tire so that the tire 1 can be sufficiently expanded after mounted on a rim, to improve the vehicle turning performance. Therefore, the tire shape before mounted on a rim is almost the same as that after vulcanization process.

Thereafter, the tire 1 is mounted on a rim 2 and then inflated at a determined pressure. Under these conditions, since the bead 6 is dislocated toward the axially outward direction, the bead 6 is securely brought into contact with the bead seat portion 2b of the rim 2 as shown in FIG. 2. In this embodiment, since the bead heel distance A before mounted on the rim (the same as the distance A after vulcanization molding process) is smaller than distance B after inflation, the bead 6 is forcedly expanded or deformed a little in the tire axially outward direction by the inner pressure into contact with the bead seat portion 2b of the rim 2.

On the other hand, in the tire 1 according to the present invention, the rigidity of the inner sidewall portion 8 is markedly increased as compared with that of the outer sidewall portion 9, because the radially outward end 11a of the carcass turned-up portion 11, that 15a of rubber filler 15, and that 18a or 19a of the inclined cord layer 18 or 19 all extend to near the tire middle height portion, respectively.

Therefore, the inner sidewall portion 8 can be deformed in the axially outward direction together with the bead 6 without deformation. That is, the bead 6 and the inner sidewall portion 8 are dislocated outwardly in parallel along the tire axis without deforming or inclining the bead 6. Therefore, the angle G of the tire outward surface at point F near the rim flange 2a with respect to a tire axial direction will not be changed after the tire is mounted on the rim and then inflated.

As described above, the middle portion of the sidewall 7 projects toward the axially outward direction, so that the maximum carcass width position C is dislocated such that the radially outward distance U of the maximum carcass width position C from the bead heel 6a after inflation (FIG. 2) decreases down to 55 to 75% of the radially outward distance V of the maximum carcass width position C from the bead heel 6a before inflation (FIG. 1). In this embodiment, the above distance U=49 mm decreases down to 67% of the distance V=73 mm.

Further, when the tire is inflated, the outer sidewall portion 9 with a relatively low rigidity is readily deformed in the axially outward direction from the shoulder end portion 4 due to the radially outward dislocation of the inner sidewall portion 8. A high tension is produced within the tire along the radial direction. As a result, a high tension is generated throughout the sidewall 7. When a high tension is generated along the sidewall 7, since the tire transversal rigidity increases, it is possible to increase the tire cornering power during vehicle travelling and thus improving the vehicle turning performance. In addition, when the outer sidewall portion 9 is deformed by tension of the inner sidewall portion 8 to generate a high tension along the sidewall, since the axially outward end of the crown portion 3 adjoining to the outer sidewall portion 9 is deformed in the radially inward direction, the circumferential tension is reduced at both the axially outward ends of the belt 25. The tire contact area with the ground is further increased and thereby the maximum cornering force can be increased to improve the vehicle turning performance.

Test results of the tires according to the present invention will be described hereinbelow. For the test, invention tires manufactured and mounted as described above and comparison tires were prepared. The comparison tires were the same as the invention tires except the following points: in the comparison tires, the bead heel distance at the vulcanization molding process was determined equal to the rim width. The maximum carcass width position is located at roughly the middle of the sidewall both after the vulcanization molding process and tire inflation. The radius of curvature is the same at both the inner and outer sidewall portions.

The test tires were rotated on flat belts under a normal load at a speed of 60 km/h and further cornering forces at various angles were measured by gradually increasing the transversal slip angles to obtain cornering powers on the basis of the measured results.

The test result indicates that the cornering power index of the invention tires was increased to 110 and the maximum cornering force thereof was increased to 115 as compared with both the indices of the comparison tires of 100, where the index 100 is 162 kg/deg in the cornering power and 468 kg in the maximum cornering force. In addition, the invention tires were mounted on the rear wheel rims of high-performance passenger cars for a practical test along a test course under the conditions that the tire inflation pressure was 2.7 kg/cm², the load was 450 kg, and the rim diameter was 8 inch. To evaluate the vehicle turning performance, the driver's vehicle-turn feeling was evaluated to obtain a feeling index. The feeling index of the invention tires was increased to 120 as compared with that of the comparison tires of 100, which indicates that the vehicle turning performance can be improved markedly without deteriorating the vehicle steering stability.

As described above, the pneumatic radial tire according to the present invention is suitable for use in high-performance passenger cars which require higher vehicle turning performance.

What is claimed is:

1. A pneumatic radial passenger car tire formed with a cylindrical crown portion and a sidewall extending from a shoulder portion to a radially innermost bead at which a bead ring is embedded, said tire comprising:
    a carcass composed of at least one organic fiber cord carcass ply, each radially inward end thereof being turned up axially outwardly around the bead ring to form a carcass turned-up portion at a tire radially outward end, said carcass having a radius of curvature $R_1$ in a crown portion radially outward side of a carcass maximum width position less than a radius or curvature $R_2$ in a bead portion radially inward of said carcass maximum width position;

a belt composed of at least two belt layers arranged on said carcass crown portion and at least one auxiliary belt layer formed by helically wrapping a rubber coated ribbon of thermoshrinkable cords;

a tread formed axially outward of said belt said tread formed during vulcanization to have a contour formed by at least three different radii of curvature which progressively decrease from a tire equatorial plane to a tire shoulder portion;

a hard rubber filler disposed between the carcass play and the carcass turned-up portion and extending taperingly from the bead ring toward the crown portion; and at least one inclined cord layer overlapped with said hard rubber filler, radially outward ends of said carcass turned-up end portions, said hard rubber filler and said inclined cord layer extending to approximately a middle of the tire sidewall to reinforce only the radially inner sidewall portion below the middle of the sidewall; a maximum carcass width position being located radially outward away from a bead heel of the bead of a distance of at least 60% of a tire section height before the tire is inflated, and is dislocated toward the bead side radially outward away from the bead heel by a distance of about 55 to 75% of the above before-inflation distance from the tire has been inflated; an axial bead heel distance between two opposite beads before the tire is inflated being smaller than that after the tire has been inflated, whereby a high tension is generated at the tire sidewall after the tire has been inflated, which increases tire transversal rigidity and further tire contact area with the ground thereby improving said passenger tire cornering power or vehicle turning performance, and said passenger car tire has an aspect ratio in the range of 0.6 to 0.3.

2. The pneumatic radial tire of claim 1, wherein a radially outward end of the carcass turned-up end portion extends to a position radially outward away from the bead heal by a distance of 55 to 75% of the tire section height; that of the rubber filler extends to a position away therefrom by a distance of 25 to 45% of the same height; that of the inclined cord layer extends to a position away therefrom by a distance of 40 to 60% of the same height so that a middle of the tire sidewall is located at a position radially outward away from the bead heel by a distance of at least 60% of the same tire section height before the tire is inflated.

3. The pneumatic radial tire of claim 1, wherein the maximum carcass width position is located radially outward away from the bead heel preferably by a distance of 60 to 75% of the tire section height before the tire is inflated with air.

4. The pneumatic radial rite of claim 1, wherein a difference in bead heel distance between the after-inflation and the before-inflation is from 12.7 (0.5 inch) and 50.8 mm (2 inch).

5. The pneumatic radial tire of claim 1, wherein cords of said single inclined cord layer intersect with cords of said carcass turned-up end portion at an inclination angle of 58 to 78 degrees.

6. The pneumatic radial tire of claim 1, wherein two inclined cord layers are disposed on the axially outward sides of said rubber filler so that cords of one inclined cord layer intersect those of the other inclined cord layer.

7. The pneumatic radial tire of claim 1, wherein a radially outward end of said inclined cord layer extends to a position between the two radially outward ends of said rubber filler and said carcass turned-up end portion.

8. The pneumatic radial tire of claim 1, wherein a shore hardness A of said rubber filler is from 65 to 95 degrees.

9. The pneumatic radial tire of claim 1, which further comprises a bead toe attached to the radially innermost end of said bead, a rubber hardness of said bead toe being the highest as compared with that of other adjoining rubber portions.

10. The pneumatic radial tire of claim 1, wherein radially inward ends of said one inclined cord layer extend to near the bead ring so as to be overlapped with a rim flange of a rim to which the tire is mounted.

* * * * *